Sept. 3, 1963 J. ARNAUD 3,102,969

DELAY LINE STRUCTURE FOR TRAVELLING WAVE AMPLIFIER TUBE
CONSISTING OF STRAPPED-TOGETHER RINGS INTERLEAVED
WITH STRAPPED-TOGETHER CYLINDERS

Filed Jan. 28, 1959

INVENTOR
J. ARNAUD
BY Paul M. Craig, Jr.
ATTORNEY

United States Patent Office 3,102,969
Patented Sept. 3, 1963

3,102,969

DELAY LINE STRUCTURE FOR TRAVELLING WAVE AMPLIFIER TUBE CONSISTING OF STRAPPED-TOGETHER RINGS INTERLEAVED WITH STRAPPED-TOGETHER CYLINDERS

Jacques Arnaud, Paris, France, assignor to Compagnie General de Telegraphie sans Fil, Paris, France Filed Jan. 28, 1959, Ser. No. 789,691
Claims priority, application France Feb. 12, 1958
7 Claims. (Cl. 315—39.3)

Figures 1, 2, 3, 4:
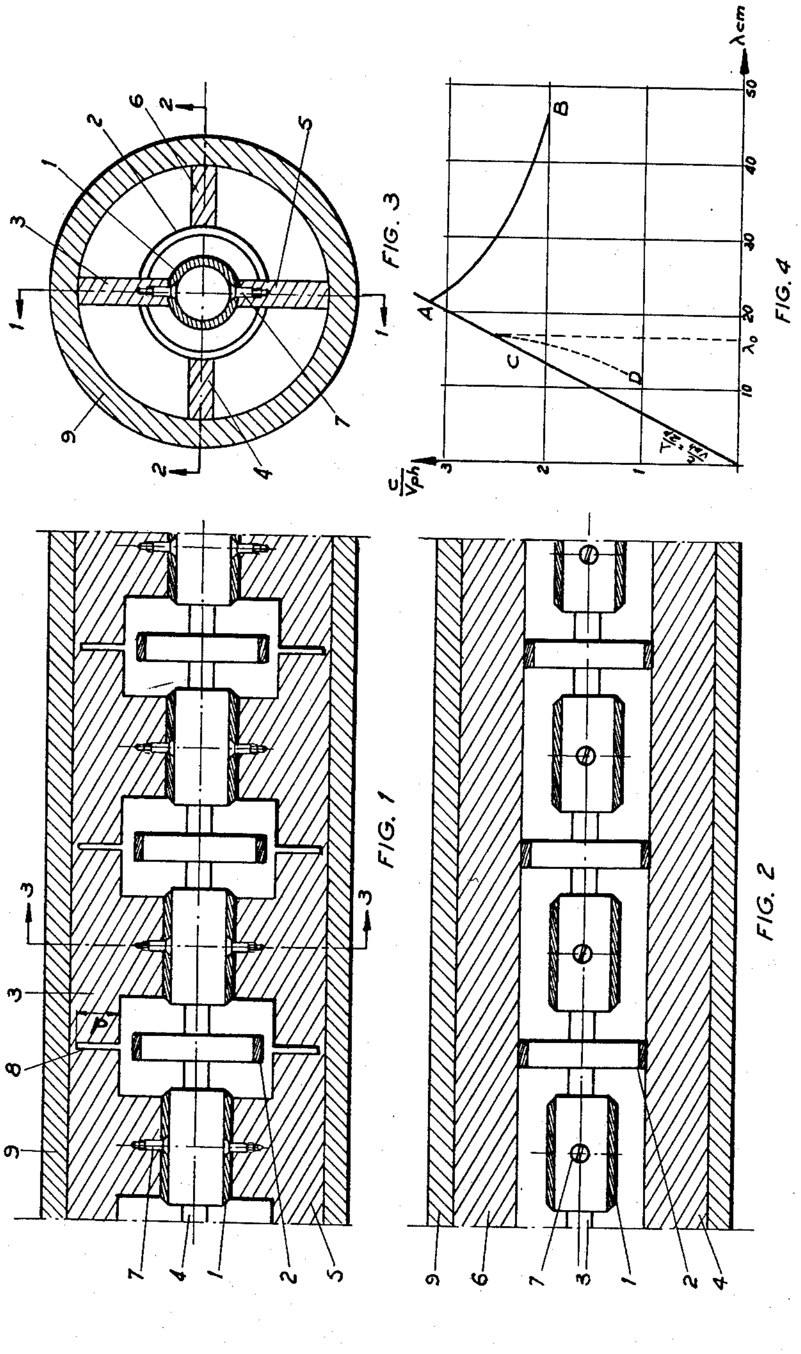

The present invention relates to a delay line structure for travelling wave discharge devices, and more particularly to a delay line structure for use in high-power travelling wave amplifiers.

When it is desirable to realize a travelling wave amplifier tube with relatively high-power output, it is common practice to operate the tube at relatively high voltages, i.e., with relatively high electron speeds, for example, of the order of one-third or of one-half of the speed of light $c$, to give some ideas. As the phase velocity of the wave $v_{ph}$ must be substantially equal to the speed of the electrons, the delay ratio $$\frac{c}{v_{ph}}$$

is, in these tubes, relatively low, for instance, of the order of 2 to 3. A delay line which is usable in these types of tubes must, therefore, be so designed and constructed as to possess such a delay ratio, and, at the same time, exhibit the following characteristics:

(*a*) A positive dispersion for the fundamental space mode since the tube in question relates to an amplifier operating by interaction with a forward or direct wave, and since the highest phase velocity corresponds to this fundamental mode, and that with a coupling resistance of the highest value. The term "dispersion" is understood to mean the product by the frequency of the derivative of the delay ratio with respect to frequency.

(*b*) A sufficiently weak dispersion for this fundamental mode within the desired frequency band spectrum since the tube under consideration relates to a wide-band amplifier in which it is necessary that the interaction takes places with effectiveness within sufficiently wide or extended limits of wave lengths.

(*c*) A good thermal dissipation since the tube under consideration is a relatively high-power amplifier tube.

The present invention relates in particular to delay lines of structure coaxial with the electron beam, for traveling wave amplifiers having such a structure, for example, to the O-type or M-type tubes having an axial tube or sleeve traversed by current, as disclosed, for example, in the United States Patent No. 2,761,088, granted on August 28, 1956, to T. Warnecke and W. Kleen and assigned to the assignee of the present application. Consequently, a further characteristic of the delay line in accordance with the present invention is therefore:

(*d*) A delay line structure which is mechanically relatively sturdy and which has an axial symmetry.

One of the main objects of the present invention is, therefore, a delay line structure in which the characteristic traits and features mentioned hereinabove are simultaneously combined in an effective manner.

Different delay line structures with axial symmetry are already known in the prior art, however, in all solutions known in the prior art at least one of the characteristics enumerated hereinabove is sacrificed for the sake of others.

The problem of reconciliation of all of the characteristics indicated and enumerated hereinabove is solved in accordance with the present invention by applying certain modifications to a delay line of known structure such as shown, for example, in FIGURES 3 and 4 of U. S. Patent 2,768,322.

FIGURES 3 and 4 of this U.S. Patent 2,768,322 represent a delay line constituted by the alignment of a series of identical cylinders, subdivided into two sets, namely an odd set and an even set. The assembly of the cylinders in this patent is supported by 2N longitudinal supports, symmetrically distributed over the periphery of the cylinders with an angular displacement or spacing of $$\frac{\pi}{N}$$

The sets of even and odd cylinders are attached alternately to successive supports thereof.

This type of delay line as exemplified by this prior U.S. Patent 2,768,322, however, exhibits a dispersion characteristic of which the fundamental is backward, i.e., a negative dispersion which by its nature is relatively strong. Consequently, this type of delay line known in the prior art does not satisfy the desired characteristics enumerated hereinabove under (*a*) and (*b*), and if such delay line is used in a forward amplifier, such amplifier can function only by interaction with the first space harmonic or with another higher direct or forward space harmonic.

According to the present invention a delay line essentially of the type described hereinabove is composed alternately of elements of different dimensions, particularly of relatiively long cylinders and relatively flat annular rings having a substantially larger diameter than the cylinders.

According to another feature of the present invention, resonant elements in the shape of slots are provided periodically in at least one of the supports of the delay line, these slots opening or terminating in the spaces between consecutive elements of the same set or chain.

Accordingly, it is an object of the present invention to provide a delay line for a high-power travelling wave amplifier in which the fundamental space wave is a forward or direct wave.

Another object of the present invention is the provision of a relatively sturdy delay line structure for use with a high-power travelling wave amplifier which is capable of dissipating effectively relatively large amounts of heat produced by the high-power ratings of the tube.

A still further object of the present invention is the provision of a delay line structure having a relatively weak or small dispersion for the fundamental wave within the limits of the frequency band within which the travelling wave amplifier is to operate.

A further object of the present invention is the provision of a delay line structure for use with a high-power forward travelling wave amplifier in which the coupling resistance is as large as possible.

These and other objects, features, and advantages of the following description when taken in connection with the accompanying drawing which shows, for purposes of illustration only, one embodiment in accordance with the present invention, and wherein.

FIGURE 1 is a longitudinal cross sectional view through a part of the delay line in accordance with the present invention, taken along line 1—1 of FIGURE 3.

FIGURE 2 is another longitudinal cross-sectional view through the same delay line portion as shown in FIGURE 1, taken along line 2—2 of FIGURE 3 substantially perpendicularly to the plane of line 1—1 along which FIGURE 1 is taken, FIGURE 3 is a transverse cross-sectional view taken along line 3—3 of FIGURE 1, and FIGURE 4 is a diagram indicating the dispersion characteristics of the delay line according to the present invention as shown in FIGURES 1–3.

Referring now to the drawing wherein like reference numerals are used throughout the different views thereof to designate like parts, and more particularly to FIGURES 1–3, reference numeral 1 designates therein an alignment of metallic cylinder elements which alternate with metallic annular members 2 forming the delay line in accordance with the present invention. The metallic annular members 2 have a smaller axial dimension but a larger diametric dimension than the cylinder members 1. The entire delay line assembly is supported, for example 2N metallic support members whereby in the instant case 2N=4 so that four metallic support members 3, 4, 5, and 6 are provided therein which are disposed symmetrically along the periphery of the delay line with a phase displacement or angular spacing with respect to each other of $$\frac{\pi}{N}=\frac{\pi}{2}$$

The metallic support members 3, 4, 5, and 6 have the general form of plates or bars disposed in radial planes of the system. The metallic support members 3, 4, 5, and 6 are assigned alternately to support the cylinder members 1 and the annular members 2 in such a manner that the pair of opposite plate or bar members 3 and 5 supports the cylinder members 1 whereas the second pair of opposite plate or bar members 4 and 6 displaced at right angle with respect to the plate members 3 and 5 supports thereon the annular members 2. The cylinder members 1 are secured to the plate members 3 and 5 in such a manner as to be removable therefrom, for example, by means of screws 7 in order to permit the assembly of the delay line. The annular members 2, on the other hand, may be secured permanently to the plate or bar members 4 and 6. The plate members 4 and 6 are simple rectangular bars whereas the plate members 3 and 5 have the general form of a comb in which pockets are provided to accommodate therein the annular members 2 of which the diameter, as indicated, is larger than that of the cylindrical members 1. However, it is understood, that the plate members 4 and 6 may also be constructed in the form of a comb-like structure, if so desired.

Radial slots 8 of which the importance and role will be explained more fully hereinafter are provided in the plate members 3 and 5 in the median planes thereof between successive cylinder members 1, i.e., facing the annular members 2.

After assembly of the delay line structure in accordance with the present invention, the same is introduced into a metallic cylinder 9 forming the base thereof, and the portions of the plate or bar members 3, 4, 5, and 6 may be secured thereto in any suitable manner, for example, by brazing to the interior wall of the cylinder 9.

FIGURE 4 represents the dispersion diagram, that is the curves of the radio $$\frac{c}{v_{ph}}$$

as a function of the wave length $\lambda$, for a delay line according to FIGURES 1–3 which is so dimensioned as to be used in an amplifier for a frequency band between 23 and 40 cm. Within the angle comprised or subtended between the axis of abscissa and the straight line $$\frac{c}{v_{ph}}=\lambda/2p$$

where $p$ is the pitch of the delay line structure and this straight line represents the location of the $\pi$ modes, is found the curve AB which corresponds to the dispersion of the fundamental wave. It may be seen from FIGURE 4 that this dispersion is positive, therefore corresponding to a direct or forward mode, that this dispersion is relatively small between the limits of $\lambda$ as indicated hereinabove, and that the delay ratio between these same limits is comprised between the values of 2 and 3. This curve AB corresponds, therefore, to the desired mode which may be utilized in an amplifier for the band of wave lengths as indicated.

However, it has been found in practice that the delay line in accordance with the present invention without slots 8, permits not only the propagation of this desirable mode, but also of other undesirable modes, such as that of which the fundamental is represented by the curve CD shown in FIGURE 4 in dotted line. This fundamental CD, however, is backward and presents a very strong dispersion. It is for purposes of impeding the propagation thereof that the slots 8 have been provided and by choosing the length of the slot approximately to a length $d$ comprised between $\lambda_0/4$ and $\lambda_0/8$ where $\lambda_0$ represents the wave length corresponding to the portion of the curve CD which extends within the region of the values for the delay ratio of between 2 and 3. By reason of the very strong dispersion within that portion of the curve CD, the latter may be assimilated to a vertical line. In the particular case of the diagram of FIGURE 4, $\lambda_0$=16 cm., approximately, therefore, $d$ will be comprised between 2 and 4 cm. With the slots 8 dimensioned as indicated hereinabove, the delay line behaves as a circuit which is resonant for the wave length $\lambda_0$ so that the propagation of this wave length is completely blocked or prevented.

It has been experimentally established and proved that this result is already obtained if the slots 8 are used in at least one of the individual supports of the cylinder 1. However, it is understood, that the present invention is not limited to a construction in which resonant slots are provided only in one of the supports of cylinders 1 but instead, if so desired, that additional resonant elements may be provided also in the supports for the annular members 2.

The present invention is not limited to the particular embodiment which has been specifically described and illustrated herein, but it is susceptible of many changes and modifications within the spirit and scope of the present invention, for example, the present invention does not depend, in particular, on the number N of which the choice and selection depends on the dimension of the delay line as a function of the constant of propagation, of the diameter and of the band width, which constitute parameters either imposed or desired as the particular case may be. Each of the delay elements 1 and 2 may, therefore, be supported not only by two supports as indicated hereinabove but also by 1, 3, 4 . . . and more supports suitably spaced from each other according to the particular characteristics of the delay line. Consequently, it is quite obvious that the present invention is not limited to the particular construction shown and described herein but is susceptible of many modifications within the spirit and scope of the present invention as known to a person skilled in the art, and I, therefore, do not wish to be limited to the particular embodiment illustrated and described herein but intend to cover all such changes and modifications as are encompassed by the scope of the appended claims.

I claim:

1. A wave delay structure comprising a chain of essentially identical conductive hollow cylinders and a chain of essentially identical conductive rings disposed in interleaved relationship with respect to said cylinders, said cylinders having a length-to-diameter ratio greater than unity and said rings having a length-to-diameter ratio less than unity, both of said chains having a common axis, the diameter of said rings being greater than that of said cylinders while the axial dimension of said cylinders is much longer than that of said rings, at least one conductive bar secured externally to all of said cylinders, at least one other conductive bar secured to all of said rings, and a conductive cylindrical support disposed around and secured to all of said bars, said bars being spaced apart by essentially equal angles.

2. A wave delay structure according to claim 1, wherein at least one of said conductive bars is provided with transverse slots at regular intervals.

3. A wave delay structure according to claim 2, wherein said transverse slots have a length comprised between $\lambda/4$ and $\lambda/8$, $\lambda$ being the wave length of an undesirable wave.

4. A wave delay structure comprising a set of essentially identical conductive hollow cylinders and a set of essentially identical conductive rings disposed in interleaved relationship with respect to said cylinders, both of said sets having a common axis, the diameter of said rings being greater than that of said cylinders while the axial dimension of said cylinders is much longer than that of said rings, two conductive bars secured externally to all of said cylinders, two other conductive bars secured to all of said rings, and a conductive cylindrical support disposed around and secured to all of said bars, said bars being spaced apart by angles of 90°.

5. A wave delay structure according to claim 4, wherein at least one of said conductive bars is provided with transverse slots.

6. A wave delay structure according to claim 5, wherein said transverse slots have a length comprised between $\lambda/4$ and $\lambda/8$, $\lambda$ being the wave length of an undesirable wave.

7. A wave delay structure comprising a set of conductive hollow cylinders and a set of conductive rings disposed in interleaved relationship with respect to said cylinders, the axial length of said rings being smaller than that of said cylinders and the diameter of said rings being greater than that of said cylinders, and both of said sets being in substantial coaxial alignment with the electron beam adapted to propagate therethrough, at least one conductive member secured to said cylinders, at least one other conductive member secured to said rings, and a conductive support disposed around and secured to said conductive members.

References Cited in the file of this patent

UNITED STATES PATENTS

| | | |
|---|---|---|
| 2,768,322 | Fletcher | Oct. 23, 1956 |
| 2,828,439 | Fletcher | Mar. 25, 1958 |
| 2,889,486 | Guenard et al. | June 2, 1959 |
| 2,924,738 | Chodorow | Feb. 9, 1960 |
| 2,942,143 | Epsztein | June 21, 1960 |